United States Patent [19]

Magauran et al.

[11] Patent Number: 4,664,820

[45] Date of Patent: May 12, 1987

[54] PREACTIVATED ORGANOPHILIC CLAY GELLANT LUBRICATING GREASE THICKENED WITH PREACTIVATED ORGANOPHILIC CLAY GELLANT AND PROCESS FOR PREPARING PREACTIVATED ORGANOPHILIC CLAY GELLANTS

[75] Inventors: Edward D. Magauran, Westhampton; Charles A. Cody, E. Windsor; William W. Reichert, Freehold; Mauriello D. Kieke, Englishtown; Steven J. Kemnetz, Trenton; Araxi Chiavoni, Hamilton, all of N.J.

[73] Assignee: NL Industries, Inc., New York, N.Y.

[21] Appl. No.: 792,146

[22] Filed: Oct. 28, 1985

[51] Int. Cl.$^4$ .......................................... C10M 125/30
[52] U.S. Cl. .................................. 252/28; 252/315.2; 252/8.511; 252/8.515
[58] Field of Search .............. 252/8.5 P, 8.5 M, 315.2, 252/316, 28

[56] References Cited

U.S. PATENT DOCUMENTS

| | | |
|---|---|---|
| 2,033,856 | 3/1936 | Smith . |
| 2,531,427 | 11/1950 | Hauser . |
| 2,658,869 | 11/1953 | Stross et al. ........................... 252/28 |
| 2,739,067 | 3/1956 | Ratcliffe . |
| 2,750,296 | 6/1956 | Curado et al. . |
| 2,754,219 | 7/1956 | Voet et al. . |
| 2,859,234 | 11/1958 | Clem . |
| 2,885,360 | 5/1959 | Haden et al. . |
| 2,886,524 | 5/1959 | Armstrong et al. .................. 252/28 |
| 3,537,994 | 11/1970 | House ..................................... 252/13 |
| 3,929,849 | 12/1975 | Oswald . |
| 3,974,125 | 8/1976 | Oswald et al. . |
| 4,054,537 | 10/1977 | Wright et al. . |
| 4,097,437 | 1/1978 | Dhake . |
| 4,105,578 | 8/1978 | Finlayson et al. ................. 252/28 X |
| 4,116,866 | 9/1978 | Finlayson ..................... 252/315.2 X |
| 4,193,806 | 3/1980 | Finlayson . |
| 4,216,135 | 8/1980 | Finlayson . |
| 4,287,086 | 9/1981 | Finlayson et al. ........... 252/8.5 P X |
| 4,317,737 | 3/1982 | Oswald et al. ......................... 252/28 |
| 4,382,868 | 5/1983 | House ..................................... 252/28 |
| 4,412,018 | 10/1983 | Finlayson et al. ................. 252/28 X |
| 4,425,244 | 1/1984 | House ..................................... 252/28 |
| 4,434,075 | 2/1984 | Mardis et al. ..................... 252/315.2 |
| 4,434,076 | 2/1984 | Mardis et al. ...................... 252/28 X |
| 4,450,095 | 5/1984 | Finlaysou .......................... 252/28 X |
| 4,464,274 | 8/1984 | House ..................................... 252/28 |
| 4,517,112 | 5/1985 | Mardis et al. ...................... 252/28 X |

FOREIGN PATENT DOCUMENTS

| | | |
|---|---|---|
| 1106281 | 3/1968 | United Kingdom . |
| 1592271 | 7/1981 | United Kingdom . |
| 2108175 | 5/1983 | United Kingdom ............ 252/315.2 |

Primary Examiner—William R. Dixon, Jr.
Assistant Examiner—Ellen M. McAvoy
Attorney, Agent, or Firm—Burns, Doane, Swecker & Mathis

[57] ABSTRACT

A preactivated organophilic clay gellant that may be used to thicken organic compositions, especially, lubricating greases without the presence of a polar activator. The preactivated organophilic clay gellant may be prepared using certain process parameters namely shearing of the smectite-type clay prior to reaction with the organic cation, dilute reaction conditions and gentle drying of the organophilic clay or the preactivated organophilic clay gellant.

83 Claims, No Drawings

PREACTIVATED ORGANOPHILIC CLAY GELLANT LUBRICATING GREASE THICKENED WITH PREACTIVATED ORGANOPHILIC CLAY GELLANT AND PROCESS FOR PREPARING PREACTIVATED ORGANOPHILIC CLAY GELLANTS

BACKGROUND OF THE INVENTION

1. Field of the Invention

The present invention relates to a preactivated organophilic clay gellant for lubricating greases and lubricating greases thickened using the gellant. The present invention also relates to a process for preparing a preactivated organophilic clay gellant and to a preactivated organophilic clay gellant made by the process.

2. Background of the Invention

It is well known in the art that organophilic clays can be used to thicken a variety of organic compositions. A problem which is often encountered in using organophilic clay gellants is that to obtain the desired level of thickening, it is necessary to disperse the gellant thoroughly in the composition. Otherwise, a much greater amount of organophilic clay gellant is needed and/or the organophilic clay particles may be larger than other particles (e.g., pigment) present in the composition thereby leading to adverse results (e.g., an unattractive rough coating or settling of the particles) and/or variations in viscosity may occur upon subjecting the composition to shear.

In an effort to achieve proper dispersion of the organophilic clay gellant, the art has explored various avenues. For example, certain organophilic clay gellants, such as shown in U.S. Pat. No. 2,531,440, were mixed with the organic composition to be thickened and the mixture subjected to high shear conditions. Alternatively, low molecular weight polar organic materials known as polar activators, dispersants, dispersion aids, solvating agents, dispersion agents and the like, which may be exemplified by acetone, methanol/water, ethanol/water, propylene carbonate, acetonylacetone, diacetone alcohol, dimethyl formamide and gammabuty-lactone, have been combined with the organophilic clay gellant in order to achieve dispersion into the organic composition. Illustrative patents which disclose these materials are U.S. Pat. Nos. 2,677,661, 2,704,276, 2,833,720, 2,879,229, 2,966,506 and 3,294,683.

One type of organic composition which still typically requires the presence of a polar activator is lubricating grease. Without the presence of a polar activator, which is generally present in an amount ranging up to 50% by weight of the gellant, most organophilic clay gellants do not achieve good dispersibility and/or achieve efficient gelation.

To avoid the danger of storing and using the generally highly volatile and flammable polar activators in the preparation of the thickened organic composition, the art has developed certain alternatives. For example, U.S. Pat. No. 4,435,218 describes a self-activating rheological additive comprising a montmorillonite clay modified with a quaternary ammonium compound and an alcohol which is solid at normal room temperature. The preferred type of solid alcohol has the formula:

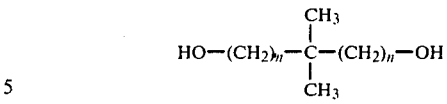

wherein n is one to five with the preferred alcohol being neopentyl glycol. Other named alcohols are 2-methyl-2-propanol; erythritol; neopentyl alcohol; 2,3,3-trimethyl-2-butanol; monopalmitate glycol; 1,3-dipalmitate glycol; 1-monolaurate glycol; 1-monooleate glycol; 1-monostearate glycol; alpha, beta-dihydroxy stearic acid; and 9,10-dihydroxy octadecanoic [acid].

European Pat. No. 133071 describes the preparation of organophilic clay rheological additives that develop gelling properties in organic liquids at low shear rates without the use of polar activators. The organophilic clays have been modified with a mono- or poly-hydroxylated nitrogeneous surfactant, such as an alkoxylated alkylamine or an alkoxylated quaternary ammonium salt with long hydrocarbon chains.

U.S. Pat. No. 2,767,177 describes the preparation of bentonite-polyamine complexes which consist of the reaction product of bentonite, polyamine and monoquaternary ammonium compounds containing two long chain alkyl groups and are useful for producing gelled greases apparently without a polar activator. The complex of bentonite, the polyamine and the quaternary ammonium compound is used to gel organic materials of a hydrocarbon nature such as liquid petroleum hydrocarbons, mineral oils, lubricating oils, aromatic liquid hydrocarbons, and halogenated hydrocarbons. To prepare the gels, the complex is incorporated into the fluid media by means of high shear mixing equipment such as a colloid mill.

U.S. Pat. No. 3,977,894 describes the preparation of a self-activating organoclay rheological additive for non-aqueous fluid systems. The self-activating organoclay is comprised of a homogenous mixture of an organically modified (with a quaternary ammonium compound) montmorillonite clay and two solid waxes. The waxes are the activators for the organophilic clay and are (1) glyceryl tri-12-hydroxystearate and (2) an amide wax having the formula:

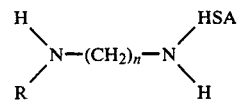

where n is from 2 to 18, HSA is the acyl radical of 12-hydroxystearic acid, R is hydrogen or the acyl radical of 12-hydroxystearic acid.

U.S. Pat. No. 4,382,868 describes organophilic clays prepared by extruding a mixture of a smectite clay, a quaternary cationic organic compound, water, and an alcohol having from 1-5 carbon atoms, which are readily dispersible in oleaginous liquids under low shear. By the definition set forth at column 6, lines 34–42, extruding means intimate mixing to cause a reaction between the clay and the organic cationic compound. It is important that the organophilic clay is not dried to remove the water or the alcohol. Representative alcohols are methanol, ethanol, and isopropanol. Additionally, other low molecular weight polar organic liquids can replace the alcohol such as ketones, amides, nitriles, nitrocompounds, esters, and carbonates (e.g., acetone, dimethyl formamide, acetonitrile, nitromethane, methyl formate, and propylene carbonate).

U.S. Pat. No. 4,464,274 is similar to U.S. Pat. No. 4,382,868 and includes organophilic clay gellants prepared from attapulgite or sepiolite clays.

OBJECTS AND SUMMARY OF THE INVENTION

Accordingly, it is a general object of the present invention to provide a preactivated organophilic clay gellant for lubricating greases and a lubricating grease which contains the preactivated organophilic clay gellant.

It is another object of the present invention to provide a preactivated organophilic clay gellant which is stable and which can be stored for extended periods.

It is a further object of the present invention to provide a preactivated organophilic clay gellant which is in dry form.

Is is a further object of the present invention to provide a preactivated organophilic clay gellant which may be used to effectively thicken organic compositions without the use of flammable materials.

It is a further object of the present invention to provide a preactivated organophilic clay gellant which may be expeditiously used to thicken organic compositions without requiring measuring and mixing of additional activating components.

It is a still further object of the present invention to provide a process for preparing a preactivated organophilic clay gellant that can be added into organic compositions in the absence of a polar activator.

It is a yet further object of the present invention to provide a preactivated organophilic clay gellant made by a defined process.

In one aspect, the present invention provides a dry preactivated organophilic clay gellant for lubricating greases. The preactivated gellant comprises:

(a) an organophilic clay gellant which is the reaction product of (i) a smectite-type clay having a cation exchange capacity of at least 75 milliequivalents per 100 grams of clay, and (ii) organic cation in an amount ranging from about 90 to about 150% of the cation exchange capacity of the smectite-type clay; and (b) a preactivating agent reacted with the organophilic clay gellant, said preactivating agent being selected from the group consisting of: phthalide, 3-hydroxy-4-methoxy benzaldehyde, 4-benzyloxypropiophenone, triethyl citrate, 2-phenoxyethanol, 1-phenyl-1,2-ethanediol, o-, m- and p-nitrobenzyl alcohol, 1,6-hexanediol, castor oil, o-, m- and p-nitrophenethyl alcohol, and mixtures thereof.

In other aspects, the present invention provides a lubricating grease which is thickened with a preactivated organophilic clay gellant, processes for preparing a preactivated organophilic clay gellant and preactivated organophilic clay gellant prepared by the processes.

DESCRIPTION OF THE PREFERRED EMBODIMENTS

As stated hereinabove, one aspect of the present invention relates to a preactivated organophilic clay gellant. The preactivated organophilic clay gellant is the reaction product of a preactivating agent and an organophilic clay which may be prepared by reacting a certain type of clay with an organic cation.

The clay which is used in the present invention is a smectite-type clay having a cationic exchange capacity of at least about 75 milliequivalents per 100 grams of clay as determined by the well known ammonium acetate method. The smectite-type clays are well known in the art and are available from a variety of sources. The clays are preferably converted to the sodium form if they are not already in this form. This can conveniently be done by preparing an aqueous clay slurry and passing the slurry through a bed of cation exchange resin in the sodium form. Alternatively, the clay can be mixed with water and a soluble sodium compound, such as sodium carbonate, sodium hydroxide, etc., and the mixture sheared, such as with a pugmill or extruder. Conversion of the clay to the sodium form can be undertaken at any point before reaction with the organic cation.

Smectite-type clays prepared synthetically by either a pneumatolytic or, preferably, a hydrothermal synthesis process can also be used to prepare these novel organic clay complexes.

Representative of smectite-type clays useful in the present invention are the following:

Montmorillonite

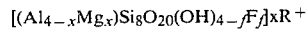

where $0.55 \leq x \leq 1.10$, $f \leq 4$ and R is selected from the group consisting of Na, Li, NH$_4$, and mixtures thereof;

Bentonite

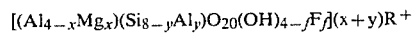

where $0 < x < 1.10$, $0 < y < 1.10$, $0.55 \leq (x+y) \leq 1.10$, $f \leq 4$ and R is selected from the group consisting of Na, Li, NH$_4$ and mixtures thereof;

Beidellite

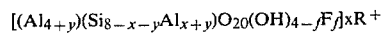

where $0.55 \leq x \leq 1.10$, $0 \leq y \leq 0.44$, $f \leq 4$ and R is selected from the group consisting of Na, Li, NH$_4$ and mixtures thereof;

Hectorite

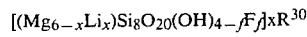

where $0.57 \leq x \leq 1.15$, $f \leq 4$ and R is selected from the group consisting of Na, Li, NH$_4$, and mixtures thereof;

Saponite

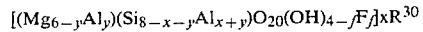

where $0.58 \leq x \leq 1.18$, $0 \leq y \leq 0.66$, $f \leq 4$ and R is selected from the group consisting of Na, Li, NH$_4$, and mixtures thereof;

Stevensite

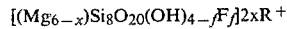

where $0.28 \leq x \leq 0.57$, $f = 4$ and R is selected from the group consisting of Na, Li, NH$_4$, and mixtures thereof.

The preferred clays used in the present invention are bentonite and hectorite, with bentonite being the most preferred.

The clays may be synthesized hydrothermally by forming an aqueous reaction mixture in the form of a slurry containing mixed hydrous oxides or hydroxides of the desired metals with or without, as the case may be, sodium (or alternate exchangeable cation or mixture thereof) fluoride in the proportions defined by the above formulas and the preselected values of x, y and f for the particular synthetic smectite desired. The slurry is then placed in an autoclave and heated under autogenous pressure to a temperature within the range of approximately 100° to 325° C., preferably 275° to 300° C., for a sufficient period of time to form the desired product. Formulation times of 3 to 48 hours are typical at 300° C. depending on the particular smectite-type clay being synthesized and the optimum time can readily be determined by pilot trials.

Representative hydrothermal processes for preparing synthetic smectite clays are described in U.S. Pat. Nos. 3,252,757, 3,586,478, 3,666,407, 3,671,190, 3,844,978, 3,844,979, 3,852,405 and 3,855,147, all of which are herein incorporated by reference.

The organic cation which is reacted with the smectite-type clay must have a positive charge localized on a single atom or on a small group of atoms within the compound. The organic cation is preferably an ammonium cation which contains at least one lineal or branched, saturated or unsaturated alkyl group having 12 to 22 carbon atoms. The remaining groups of the cation are chosen from (a) lineal or branched alkyl groups having 1 to 22 carbon atoms; (b) aralkyl groups which are benzyl and substituted benzyl moieties including fused ring moieties having lineal or branched 1 to 22 carbon atoms in the alkyl portion of the structure; (c) aryl groups such as phenyl and substituted phenyl including fused ring aromatic substituents; (d) beta, gamma-unsaturated groups having six or less carbon atoms or hydroxyalkyl groups having two to six carbon atoms; and (e) hydrogen.

The long chain alkyl radicals may be derived from natural occurring oils including various vegetable oils, such as corn oil, coconut oil, soybean oil, cottonseed oil, castor oil and the like, as well as various animal oils or fats such as tallow oil. The alkyl radicals may likewise be petrochemically derived such as from alpha olefins.

Representative examples of useful branched, saturated radicals include 12-methylstearyl and 12-ethylstearyl. Representative examples of useful branched, unsaturated radicals include 12-methyloleyl and 12-ethyloleyl. Representative examples of unbranched saturated radicals include lauryl; stearyl; tridecyl; myristyl (tetradecyl); pentadecyl; hexadecyl; hydrogenated tallow, docosanyl. Representative examples of unbranched, unsaturated and unsubstituted radicals include oleyl, linoleyl, linolenyl, soya and tallow.

Additional examples of aralkyl, that is benzyl and substituted benzyl moieties, would include those materials derived from, e.g. benzyl halides, benzhydryl halides, trityl halides, α-halo-α-phenylalkanes wherein the alkyl chain has from 1 to 22 carbon atoms, such as 1-halo-1-phenylethane, 1-halo-1-phenyl propane, and 1-halo-1-phenyloctadecane; substituted benzyl moieties, such as would be derived from ortho-, meta- and para-chlorobenzyl halides, para-methoxybenzyl halides, ortho-, meta- and para-nitrilobenzyl halides, and ortho-, meta- and para-alkylbenzyl halides wherein the alkyl chain contains from 1 to 22 carbon atoms; and fused ring benzyl-type moieties, such as would be derived from 2-halomethylnaphthalene, 9-halomethylanthracene and 9-halomethylphenanthrene, wherein the halo group would be defined as chloro, bromo, iodo, or any other such group which serves as a leaving group in the nucleophilic attack of the benzyl type moiety such that the nucleophile replaces the leaving group on the benzyl type moiety.

Examples of aryl groups would include phenyl such as in N-alkyl and N,N-dialkyl anilines, wherein the alkyl groups contain between 1 and 22 carbon atoms; ortho-, meta- and para-nitrophenyl, ortho-, meta- and para-alkyl phenyl, wherein the alkyl group contains between 1 and 22 carbon atoms, 2-, 3-, and 4-halophenyl wherein the halo group is defined as chloro, bromo, or iodo, and 2-, 3-, and 4-carboxyphenyl and esters thereof, where the alcohol of the ester is derived from an alkyl alcohol, wherein the alkyl group contains between 1 and 22 carbon atoms, aryl such as a phenol, or aralkyl such as benzyl alcohols; fused ring aryl moieties such as naphthalene, anthracene, and phenanthrene.

The β, γ-unsaturated alkyl group may be selected from a wide range of materials. These compounds may be cyclic or acyclic, unsubstituted or substituted with aliphatic radicals containing up to 3 carbon atoms such that the total number of aliphatic carbons in the β,γ-unsaturated radical is 6 or less. The β, γ-unsaturated alkyl radical may be substituted with an aromatic ring that likewise is conjugated with the unsaturation of the β,γ-moiety or the β,γ-radical is substituted with both aliphatic radicals and aromatic rings.

Representative examples of cyclic β, γ-unsaturated alkyl groups include 2-cyclohexenyl and 2-cyclopentenyl. Representative examples of acyclic β,γ-unsaturated alkyl groups containing 6 or less carbon atoms include propargyl; allyl(2-propenyl); crotyl(2-butenyl); 2-pentenyl; 2-hexenyl; 3-methyl-2-butenyl; 3-methyl-2-pentenyl; 2,3-dimethyl-2-butenyl; 1,1-dimethyl-2-propenyl; 1,2-dimethyl propenyl; 2,4-pentadienyl; and 2,4-hexadienyl. Representative examples of acyclic-aromatic substituted compounds include cinnamyl(3-phenyl-2-propenyl); 2-phenyl-2-propenyl; and 3-(4-methoxyphenyl)-2-propenyl. Representative examples of aromatic and aliphatic substituted materials include 3-phenyl-2-cyclohexenyl; 3-phenyl-2-cyclopentenyl; 1,1-dimethyl-3-phenyl-2-propenyl; 1,1,2-trimethyl-3-phenyl-2-propenyl; 2,3-dimethyl-3-phenyl-2-propenyl; 3,3-dimethyl-2-phenyl-2-propenyl; and 3-phenyl-2-butenyl.

The hydroxyalkyl group is selected from a hydroxyl substituted aliphatic radical wherein the hydroxyl is not substituted at the carbon adjacent to the positively charged atom, and the group has from 2 to 6 aliphatic carbons. The alkyl group may be substituted with an aromatic ring independently from the 2 to 6 aliphatic carbons. Representative examples include 2-hydroxyethyl (ethanol); 3-hydroxypropyl; 4-hydroxypentyl; 6-hydroxyhexyl; 2-hydroxypropyl (isopropanol); 2-hydroxybutyl; 2-hydroxypentyl; 2-hydroxyhexyl; 2-hydroxycyclohexyl; 3-hydroxycyclohexyl; 4-hydroxycyclohexyl; 2-hydroxycyclopentyl; 3-hydroxycyclopentyl; 2-methyl-2-hydroxypropyl; 1,1,2-trimethyl-2-hydroxypropyl; 2-phenyl-2-hydroxyethyl; 3-methyl-2-hydroxybutyl; and 5-hydroxy-2-pentenyl.

The organic cation can thus be considered as having at least one of the following formulae:

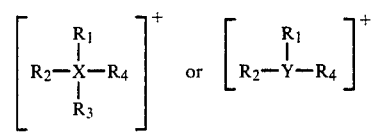

wherein X is nitrogen or phosphorus, Y is sulfur, $R_1$ is the long chain alkyl group and $R_2$, $R_3$ and $R_4$ are representative of the other possible groups described above.

A preferred organic cation contains at least one lineal or branched, saturated or unsaturated alkyl group having 12 to 22 carbon atoms and at least one lineal or branched, saturated or unsaturated alkyl group having 1 to 12 carbon atoms. The preferred organic cation may also contain at least one aralkyl group having a lineal or branched, saturated or unsaturated alkyl group having 1 to 12 carbons in the alkyl portion. Mixtures of these cations may also be used. .

Especially preferred organic cations are an ammonium cation where $R_1$ and $R_2$ are hydrogenated tallow and $R_3$ and $R_4$ are methyl or where $R_1$ is hydrogenated tallow, $R_2$ is benzyl and $R_3$ and $R_4$ are methyl or a mixture thereof such as 90% (equivalents) of the former and 10% (equivalents) of the latter.

The amount of organic cation reacted with the smectite-type clay depends upon the specific clay and the desired degree of hydrophobicity. Typically, the amount of cation ranges from about 90 to about 150%, preferably from about 100 to about 130% and most preferably from about 100 to about 116% of the cation exchange capacity of the clay. Thus, for example, when bentonite is used, the amount of cation reacted with the clay will range from about 85 to about 143 milliequivalents, preferably from about 95 to about 124 milliequivalents and most preferably from about 95 to about 110 milliequivalents per 100 grams of clay, 100% active basis. As is apparent to those of ordinary skill in the art, the cation exchange ratio of the clay is on the basis of the original clay and is determined by the ammonium acetate method.

The anion which will normally accompany the organic cation is typically one which will not adversely affect the reaction product or the recovery of the same. Such anions may be exemplified by chloride, bromide, iodide, hydroxyl, nitrite and acetate in amounts sufficient to neutralize the organic cation.

The preparation of the organic cationic salt (i.e., the organic cation paired with the anion) can be achieved by techniques well known in the art. For example, when preparing a quaternary ammonium salt, one skilled in the art would prepare a dialkyl secondary amine, for example, by the hydrogenation of nitriles, see U.S. Pat. No. 2,355,356, and then form the methyl dialkyl tertiary amine by reductive alkylation using formaldehyde as a source of the methyl radical. According to procedures set forth in U.S. Pat. Nos. 3,136,819 and 2,775,617, quaternary amine halide may then be formed by adding benzyl chloride or benzyl bromide to the tertiary amine. The contents of these three patents are hereby incorporated by reference.

As is well known in the art, the reaction with benzyl chloride or benzyl bromide can be completed by adding a minor amount of methylene chloride to the reaction mixture so that a blend of products which are predominantly benzyl substituted is obtained. This blend may then be used without further separation of components to prepare the organophilic clay.

Illustrative of the numerous patents which describe organic cationic salts, their manner of preparation and their use in the preparation of organophilic clays are commonly assigned U.S. Pat. Nos. 2,966,506, 4,081,496, 4,105,578, 4,116,866, 4,208,218, 4,391,637, 4,410,364, 4,412,018, 4,434,075, 4,434,076, 4,450,095 and 4,517,112, the contents of which are incorporated by reference.

The preactivating agent is at least one compound that may be reacted with the organophilic clay gellant so as to increase the d-spacing between the clay platelets at least one angstrom, preferably at least two angstroms and most preferably at least three angstroms as determined by x-ray diffraction of a non-heated sample. To achieve the increase in d-spacing, the preactivating agent has at least one active group selected from the group consisting of carboxyl, hydroxyl, primary amine, secondary amine, amide, aldehyde, ketone, ether, ester, nitro and sulfo.

Illustrative preactivating agents are decanol, dodecanol, benzyl alcohol, eugenol, 2-N-propylphenol, triphenyl methanol, 3-nitroethanol, stearyl alcohol, tetraethylene glycol, triethylene glycol, glycerol, 1,4-butanediol, propylene glycol, pentaerythritol, 1,4-butanediol diglycidyl ether, phenyl ether, ethyl stearate, butyl benzoate, benzyl acetate, ethyl benzoate, phthalic anhydride, triethanol amine, dimethyl sulfoxide, propiophenone, 6-undecanone, p-anisaldehyde, diphenyl methane, eicosane and mixtures thereof.

Further illustrative preactivating agents, which are particularly useful for preactivating organophilic clay gellants for lubricating greases, are phthalide, 3-hydroxy-4-methoxybenzaldehyde, 4-benzyloxypropiophenone, triethyl citrate, 2-phenoxyethanol, 1-phenyl-1,2-ethanediol, o-, m- and p-nitrobenzyl alcohol, 1,6-hexanediol, castor oil, o-, m- and p-nitrophenethyl alcohol and mixtures thereof. Preferred preactivating agents are phthalide, the nitrobenzyl alcohols, the nitrophenyl alcohols, 1-phenyl-1,2-ethanediol, 1,6-hexanediol and mixtures thereof with the most preferred preactivating agent being 1,6-hexanediol.

It is interesting to note that the foregoing preactivating agents are generally not typical polar activators. Thus, for example, if 1,6-hexanediol is used as a conventional polar activator (i.e., mixed with the base fluid and the organophilic clay gellant), it will yield results which are significantly inferior to those obtained than when the compound is used as a preactivating agent in accordance with the present invention.

Although the amount of the preactivating agent to be reacted with the organophilic clay gellant will generally vary depending on the particular preactivating agent, organophilic clay gellant and organic composition to be thickened, the amount of preactivating agent reacted with the organophilic clay gellant is typically from about 1 to about 25%, preferably from about 3 to about 17% by weight of the organophilic clay. For a preactivated organophilic clay gellant for lubricating grease wherein 1,6-hexanediol is the preactivating agent, the amount of 1,6-hexanediol is from about 1 to about 18%, preferably from about 3 to about 14% and most preferably from about 4 to about 12% by total weight of the organophilic clay and the preactivating agent.

To improve the efficiency and effectiveness of the preactivated organophilic clay gellant of the present invention, certain process parameter(s) may be employed. More specifically, the smectite-type clay is sheared to a considerable extent prior to reaction with the organic cation. To achieve further improved results, the shearing step may be combined with using dilute reaction conditions when the organic cation is reacted with the smectite-type clay and/or gentle drying of the organophilic clay or preactivated organophilic clay gellant (depending on the mode of reacting the organophilic clay and the preactivating agent). Most preferably, all of the process parameters are incorporated into the process of preparing the preactivated organophilic clay gellant.

A further discussion of the process parameters may be found in commonly assigned copending U.S. application Ser. No. 767,599, filed on Aug. 20, 1985, the contents of which are incorporated by reference.

To achieve shearing of the smectite-type clay, the clay is dispersed in water at a concentration of from about 0.5 to about 80% by weight. The slurry may optionally be first centrifuged to remove non-clay impurities which constitute about 10% to about 50% of the starting clay composition. Of course, if the clay has previously been treated, such as by the clay vendor, to remove the impurities, the treated clay can be formed into a slurry at a concentration of from about 0.5 to about 80% by weight, preferably from about 0.5 to about 2.5% by weight and directly subjected to shearing so as to separate the clay agglomerates. The shear conditions are selected such that sufficient separating of the clay agglomerates occurs as can be determined by the methylene blue spot test or particle size analysis.

The methylene blue spot test measures the cation exchange and adsorption capacity of the clay by reacting the clay with a methylene blue solution. A typical procedure is as follows:

1. Weigh 10 grams (±1 mg) of a clay slurry of known solids content (usually about 3% by weight) into a 250 ml Ehrlenmeyer flask.
2. Add 50 ml distilled water and stir using a magnetic stirrer.
3. Add 2 ml 5N sulfuric acid and stir.
4. Add methylene blue solution (1 ml=0.01 milliequivalents) to the flask at a rate of 1 to 2 drops per second until 110 m.e./100 gms (calculated from clay weight used) has been added.
5. Wash down flask with distilled water and continue to stir for about 10-15 minutes.
6. While the solids are suspended, remove one drop of liquid with the stirring rod and place the drop on filter paper (Whatman No. 1), labelling the drop with the burette reading in 0.1 mls.
7. There should be no greenish-blue halo surrounding the dyed solids.
8. Add increments of 0.2 to 0.5 ml of methylene blue solution stirring at least 5 minutes after each additon and washing down with distilled water after each addition. After 5 minutes stirring, run the drop test, recording for each test spot the burette reading.
9. When a faint green-blue halo surrounds the suspended solids of the spot test, stir an additional 10 minutes and repeat the spot test. If the halo persists the end point has been exceeded.
10. The methylene blue adsorption is expressed as milliequivalents of methylene blue per 100 grams of clay and is calculated as follows:

$$\text{clay capacity} = \frac{\text{mls. methylene blue} \times 100}{(\text{gms of slurry} \times \% \text{ solids})}$$

To minimize human error in the determination of the end point, some of the clay slurry may be filtered through coarse filter paper (e.g., Whatman 5H), the intensity of the filtrate compared with methylene blue blank solutions at 1668 or 609 mm on a colorimeter and correcting the degree of overrun or underrun of the end point.

Using the methylene blue spot test, sufficient shear should be imparted to the clay slurry so as to obtain an increase in the clay capacity of from about 10 to about 50%, preferably from about 15 to about 40% and most preferably from about 20 to about 35% when compared to the unsheared clay. Thus, for example, sufficient shearing may be imparted to a 3% bentonite slurry so as to increase the clay capacity as determined by the methylene blue spot test from about 115 milliequivalents per 100 grams of clay to about 135 milliequivalents per 100 grams of clay.

A further technique for determining that sufficient shear has been imparted to the clay slurry is to conduct a particle size analysis. That is, unsheared clay particles are analyzed, such as with a Nicomp Model 270 Submicron Particle Sizer available from Pacific Scientific Company which operates on a laser light scattering principle and the clay then sheared. The sheared clay has a reduction in median particle size of from about 10 to about 80%, preferably from about 20 to about 60% when compared to the unsheared clay particles. Thus, for example, an unsheared 3.0% bentonite clay slurry may exhibit an average median particle size of 0.64 microns. If this identical slurry is subjected to an increasing amount of shear which can be accomplished by passing the clay slurry through a Manton-Gaulin homogenizer at various pressures, then the following decreasing median particle sizes are observed: 0.5 microns (1,000 psi); 0.43 microns (2,000 psi); 0.42 microns (3,000 psi); 0.37 microns (4,000 psi); and 0.37 microns (5,000 psi). This same trend in decreasing median particle size of the clay solids with increasing shear can be observed when a 3.0% bentonite clay slurry is subjected to increasing shear times in a Waring Blendor operating at high speed for various lengths of time: 0.66 microns (0 minutes); 0.58 microns (2 minutes); 0.54 microns (4 minutes); 0.52 microns (6 minutes); 0.53 microns (8 minutes); and 0.52 microns (10 minutes).

Shear can be imparted to the smectite-type clay slurry by means of commercially available equipment that is known to impart high shear to the material. Illustrative of such equipment are a Manton-Gaulin homogenizer available from Manton-Gaulin Company (now known as an APV Gaulin homogenizer available from APV Gaulin, Inc.), a Tekmar SD-45 Homogenizer available from Tekmar Company, a Sharples Super Centrifuge available from Sharples Division of Pennwalt Corporation, an Oakes mill available from Oakes Machinery, a Waring Blendor available from Waring Products, a Microfluidizer available from Microfluidics Corporation, a division of Biotechnology Corporation, and similar devices which can impart high laminar and turbulent shear to the clay slurry. Exemplary conditions using a Manton-Gaulin homogenizer are a pressure in the range from about 500 to about 8000 psi with one or more passes of the clay slurry through the homogenizer.

The second process parameter which may be used in the process is a dilute reaction medium when the smectite-type clay and organic cation are reacted. Dilution can be performed before or during clay shearing, but is more preferably performed after shearing has been conducted. Of course, dilution can be performed before, during and after shearing if so desired. The clay slurry is diluted so that the clay content is from about 0.5 to about 2.5% by weight, preferably from about 0.5% to about 2.0% by weight and most preferably from about 0.5 to about 1.5% by weight of the slurry. To the extent that dilution is performed after shearing, it can be achieved either by adding the required amount of water to the clay slurry prior to or during the addition of the organic cation or by adding the required amount of water to the clay slurry and the organic cation or by adding water only to the organic cation which is then added to the clay slurry. The important result is that the reaction of the organic cation with the clay occurs under dilute conditions. That is, the clay is within the aforementioned ranges when reacted with the organic cation (the amount of organic cation is not included in the calculation of the clay content of the slurry). These dilute reaction conditions help increase the viscosity-build capabilities of the organophilic clay gellant over similar gellants prepared according to standard organophilic clay preparation procedures which do not use such dilute conditions.

Prior to reaction of the smectite-type clay slurry with the organic cation, the slurry is agitated and heated to a temperature in the range 20° to 100° C., preferably 45° to 75° C. Any range of normal stirring speeds can be applied to the reaction slurry. The organic cation may be added neat or dispersed in water or water mixed with a miscible organic solvent such as isopropyl alcohol. As indicated above, these latter two instances may be conducted in order to achieve dilute reaction conditions. The organic solvent is used with water to solubilize the organic material, but has no effect on the performance of the final organophilic clay at lower concentrations.

After the addition of the organic cation, the reaction mixture is mixed with agitation at a temperature between 20° and 100° C., preferably 45° to 75° C., for a sufficient time to permit exchange of organic cation onto the clay. Reaction temperatures below 20° C. or above 100° C. while usable, are not preferred because of the need for additional processing apparatus, namely cooling devices and pressure reactors.

The reacted product is then filtered and can be repulped with additional water to promote washing and then refiltered. Whereas washing the filtered product following the formation of the organophilic clay is highly desirable to remove salts such as sodium halides, it is not necessary when the product is prepared under dilute reaction conditions since the amount of salt remaining is only slightly detrimental to viscosity performance.

After the organophilic clay gellant is separated from the reaction mixture, it is dried. In the past, commercial organophilic clays have typically been dried in an airstream at elevated temperatures within the range of from about 120° to about 250° C. In accordance with the present invention, it has been found that more gentle drying conditions can lead to improved gellant performance. The gentle drying conditions are important to preserve and enhance the benefits obtained by shearing and/or dilution.

The gentle drying of the organophilic clay in accordance with this aspect of the present invention is conducted such that the wet organophilic clay should not exceed about 80° C. during drying. One manner of achieving this goal is to dry the organophilic clay gellant in an airstream at from about 0° to about 80° C., preferably from about 0° to about 50° C. until the moisture content is less than about 5%, preferably less than 2%. Alternatively, the organophilic clay gellant can be dried in a fluidized bed which is maintained at a temperature in the range of from about 25° to about 125° C., preferably from about 25° to about 100° C. Of course, when a fluidized bed is used, the temperature and air flow are selected such that the rapid evaporation of water keeps the organophilic clay gellant in the bed below about 80° C. until it is dried. As a still further alternative, the organophilic clay gellant may be freeze-dried at a temperature below about 0° C.

After the organophilic clay gellant is dried, it is typically ground using a hammer mill or similar grinding apparatus to break apart the agglomerates. The ground organophilic clay gellant generally has a particle size in the range of from about 0.1 to about 500 microns, preferably from about 1 to about 150 microns. Naturally, the desired size of the organophilic clay gellant particles is dictated by the environment of use.

The preactivating agent may be reacted with the organophilic clay using various techniques. More specifically, the dried organophilic clay particles may be dry blended, such as by using a P-K blender, under ambient conditions with powdered preactivating agent (particle size typically less than about 0.55 mm) for a time sufficient for reaction to occur (typically from about 1 minute to about 4 hours, preferably from about 30 to about 60 minutes) as can be determined by the increase in d-spacing. Alternatively, the preactivating agent can be melted or dispersed in a liquid medium, such as water, methanol, ethanol or mixtures thereof, and sprayed onto the dried organophilic clay particles, preferably with agitation to improve contacting and distribution.

In the event that the organophilic clay has been subjected to harsh drying conditions (i.e., above about 80° C.), the preactivating agent and the organophilic clay may be dry milled using a hammer mill, ring roller mill, Brinkman mill or any other apparatus that can impart shear to the components, for a time sufficient to obtain the indicated increase in d-spacing. The preactivating agent (in any of the forms previously described) and the organophilic clay may be directly added to the dry milling apparatus or may be initially mixed in a separate mixer and then subjected to the dry milling step.

The preactivating agent may also be reacted with the organophilic clay before the clay is dried. For example, the preactivating agent may be added to the slurry containing the formed organophilic clay gellant or may be formed in a liquid dispersion and passed through the organophilic clay filter cake. Of course in these instances, the concentration of the preactivating agent in the slurry or liquid dispersion is selected such that the appropriate amount of preactivating agent is reacted with the organophilic clay. The preactivated organophilic clay gellant is then dried, preferably under the mild conditions noted above, ground to an appropriate size as discusssed above and is ready for immediate use or packaging.

The preactivated organophilic clay gellant of the present invention exhibits numerous advantageous properties. In particular, the preactivated gellant is in dry form (i.e., less than about 5% moisture, preferably less than 2% moisture) which facilitates handling and shipping and may be stored over prolonged periods without degradation.

The preactivated organophilic clay gellants of the present invention can be used to efficiently and effectively increase the viscosity of various organic compositions. Depending in large part on the composition, the organophilic clay gellant can be used in a conventional manner to thicken organic compositions exemplified by lubricating greases, oil base muds, oil base packer fluids, paint-varnish-lacquer removers, paints, cosmetic foundations, foundary moldings, sand binders, adhesives, sealants, inks, polyester laminating resins and polyester gel coats. As can be understood, the organophilic clay gellant is selected such that it is effective in the particular organic composition. For example, bentonite or hectorite clay can be reacted with dimethyl dihydrogenated tallow ammonium cation to produce a gellant well suited for thickening lubricating greases. Other specific gellants may be ascertained from the above-identified commonly assigned U.S. patents which have been incorporated by reference and the Examples set forth later.

The preactivated organophilic clay gellants of the present invention may be used to thicken organic compositions effectively and efficiently without the need for known polar activators which are often highly flammable. While polar activators can be used with the preactivated organophilic clay gellants, it is to be understood that such polar activators are not required to obtain the desired thickened organic composition.

The amount of preactivated organophilic clay gellant used in the organic compositions depends on the specific gellant, composition and level of thickening desired, but generally is in the range of from about 1 to about 12% by weight, preferably from about 4 to about 8% by weight. To improve the gelation of the composition, a small amount of water should be present. The amount of water can also vary, but is typically in the range of from about 0.1 to about 10%, preferably from about 0.5 to about 6.0% and most preferably from about 2.0 to about 4.0% by weight of the preactivated organophilic clay gellant present in the organic composition.

Lubricating greases which may be prepared by using the preactivated organophilic clay gellants of the present invention have well known base fluids. These base fluids may be: 1. Low viscosity index oils and high viscosity oils which are either paraffinic or naphthenic oils or mixtures thereof. Paraffinic oils consist of straight chain and branched chain paraffinic hydrocarbons, usually of $C_{12}$–$C_{24}$ carbon lengths. Napthenic oils consist of cyclic saturated hydrocarbons and usually include aromatic hydrocarbons. Paraffinic oils are rarely exclusively paraffinic, containing sizeable portions of naphthenic hydrocarbons. Representative types include:

| Type | Composition | Viscosity Index |
|---|---|---|
| Coastal Pale | hydrocarbon of 50/50 cyclic/ branched and straight chain | 12 |
| Solvent-extracted neutral | hydrocarbon of 70/30 straight and branched chain/ cyclic | 95 |
| Solvent-extracted neutral | hydrocarbon 70% straight and branched chain | 95 |
| Bright stock | hydrocarbon 70% straight and branched chain | 96 |
| Mineral oil | paraffinic | varies |

2. Polyglycols (synthetic oil)

Polyglycol base stock consists of polymerized ethylene glycol and/or propylene glycol.

3. Organic esters (synthetic oil)

Organic esters are formed from the reaction of dibasic acids with monohydroxy alcohols or from the reaction of monobasic acids with polyhydroxy alcohols. For example, a di-ester could be made from azelaic acid and 2-ethylhexyl alcohol which yields di(2-ethylhexyl)azelate. A second example is di-isooctyl azelate and a third example is di-2-ethylhexyl sebacate. A mono-ester could be made from perlargonic acid and pentaerythritol. Another example of a mono-ester fluid would be dipropylene glycol dipelargonate.

4. Synthetic hydrocarbons

Synthetic hydrocarbon fluids consist of two types: polyalphaolefins and alkylated aromatics. Polyalphaolefins are produced through the limited polymerization of an alphaolefin. For example, a tetramerized 1-octene will yield a hydrocarbon of 32 carbons and a trimerized 1-decene will yield of hydrocarbon of 30 carbons.

A dialkyl benzene would be an alkylated aromatic.

5. Silicone fluids

A typical composition for a silicone fluid is an alkylmethyl polysiloxane. A second type of fluid is a phenyl methyl silicone.

6. Vegetable oils and other triglycerides:

Castor oils, jojoba oil, linseed oil, cottonseed oil, etc.

Additional information concerning lubricating greases and how they may be formed using organophilic clay gellants may be found in "Modern Lubricating Greases" by C. J. Boner (Scientific Publications, Broseley, Shropshire, England, 1976), and "Lubricating Grease Guide" (National Lubricating Grease Institute, 4635 Wyandotte St., Kansas City, Mo. 64112, 1 st Edition, 1984).

One particularly useful base fluid for lubricating greases is Conoco 5735 oil (a commercial product available from Continental Oil Company) which is a high viscosity solvent refined paraffinic petroleum-lubricating oil. A typical composition has approximately 68% paraffinic, 28% naphthenic, and 4% aromatic components by weight.

To demonstrate the effectiveness of the preactivated organophilic clay gellants which are suitable for the preparation of lubricating greases, the preactivated organophilic clay gellant may be mixed with Conoco 5735 oil at an 8% by weight concentration using a drill press stirrer fitted with two 4½ inch diameter blades at 10° pitch separated with 1½ inch. The grease pregel is then passed through a rotor-stator type Tri-Homo mill available from Sonic Corporation with a rotor-to-stator gap of 0.003 inch and a pump speed of 230 g/min. The grease is cooled to room temperature (25° C.) and a depth of penetration measurement is made according to ASTM Method D217-82 using a grease penetrometer available from GCA/Precision Scientific Company. A penetration value of 315 or lower indicates that the organophilic clay has been effectively preactivated. Preferably, the penetration value is 300 or lower and most preferably the penetration value is 290 or lower.

To demonstrate that the lubricating greases thickened using the preactivated organophilic clay gellants of the present invention are stable upon working, the lubricating grease can be placed in a grease worker available from Koehler Instrument Company and depth of penetration values determined after 60 strokes and 10,000 strokes. The difference in penetration values will be less than about 50, preferably less than about 25 and most preferably less than about 10.

As is well known in the art, the lubricating greases may also contain conventional amounts of antioxidants, pigments, soluble dyes, rust inhibitors, anti-wear and extreme pressure additives, tackifiers, powder metals, fillers and mixtures thereof.

The following inventive and comparative examples are given to illustrate and contrast the present invention. However, the examples should not be construed as limiting the invention. Unless otherwise indicated, all percentages are given in weight percent of the total composition.

EXAMPLE 1

About 40 gallons of a 3.03% solids slurry of Wyoming bentonite in water which has been previously treated by centrifugation to remove all non-clay impurities and ion-exchanged to provide the clay in the sodium form is passed through a Manton-Gaulin homogenizer at 5000 psi pressure. 5610.6 grams of this slurry is placed in a reaction vessel of a suitable size (8 liters) and diluted with 1133 ml of water. The slurry is heated to 65° C. with stirring. 110.30 grams of melted 90% active dimethyl bis(hydrogenated tallow) ammonium chloride (101 m.e. per 100 grams clay) is poured into the clay slurry. 56 ml of hot water is used to rinse the organic cation. (The amount of water added to the reaction slurry is equal to an amount which, when added to the clay slurry, will yield a solids content of 2.5%). The mixture is stirred for 30 minutes at 65° C. and the solids are collected on a vacuum filter. The filter cake is washed with hot (60° C.) water and force air dried at 40° C. for 16 hours to remove residual water from the organophilic clay. The dried organophilic clay is ground in a centrifugal mill fitted with a 0.5 mm screen to break apart the agglomerates.

The dried, ground organophilic clay (55 grams) is dry blended in a P-K blender for 1 hour with 7% (4.14 grams) and 9% (5.44 grams) 1,6-hexanediol powder that has been previously ground cold in a centrifugal mill fitted with a 0.5 mm screen.

Samples of the dry powdered preactivated organophilic-clay gellant and a non-preactivated control are backloaded using moderate hand pressure into a standard powder x-ray diffraction sample holder which has a glass microscope slide taped over the front. The glass slide is carefully removed from the sample holder such that the surface of the packed powder is level with the sample holder. The holder is then placed in a Philips 3600 x-ray diffraction unit and scanned from 1.5°–32° $2\theta$ using Cu K$\alpha$ radiation and standard scanning conditions. The resulting diffraction pattern is a series of peaks with the strongest peak between 2° and 4° $2\theta$. The exact angle of this peak is determined and then the spacing is calculated using Bragg's Law: $=2d \sin \theta$ where $\lambda$ for Cu K$\alpha = 1.54056$ Å. The result is the d(001) spacing of the sample expressed in angstroms.

The results are as follows:

| Sample | d(001) spacing |
| --- | --- |
| Control (0% preactivating agent) | 25.5 angstroms |
| Preactivated (7%) organophilic clay gellant | 28.2 angstroms |
| Preactivated (9%) organophilic clay gellant | 30.1 angstroms |
| Preactivated (7%) organophilic clay gellant (heated at 67° C. for 6 hours) | 29.9 angstroms |

Further samples of an organophilic clay are prepared from bentonite and dimethyl bis(hydrogenated tallow) ammonium chloride in accordance with the previously described procedure. The dried organophilic clay is reacted with various preactivating agents in various amounts by dispersing the preactivating agent in an ethanol/water mixture and spraying the dispersion onto an agitated portion of the organophilic clay. The d-spacing is then determined using the procedure set forth above and the results are as follows:

| Preactivating Agent | d(001)-spacing (angstroms) | % Preactivating Agent Based on Total Weight of Organophilic Clay and Preactivating Agent |
| --- | --- | --- |
| ethyl stearate | 37.2 | 14.1 |
| triethyl citrate | 35.4 | 17.1 |
| butyl benzoate | 33.6 | 9.5 |
| benzyl acetate | 28.3 | 7.2 |
| ethyl benzoate | 28.0 | 6.6 |
| phthalic anhydride | 31.9 | 21.1 |
| triethanol amine | 34.2 | 9.6 |
| dimethyl sulfoxide | 28.3 | 4.5 |
| propiophenone | 32.6 | * |
| 6-undecanone | 33.6 | 7.7 |
| p-amisaldehyde | 31.4 | 10.0 |
| diphenyl methane | 31.9 | 7.3 |
| eicosane | 31.6 | 16.3 |
| caprylic acid | 36.8 | 14.5 |
| heptanoic acid | 35.9 | * |
| benzamide | 33.0 | * |
| formamide | 31.0 | * |
| propionamide | 29.7 | * |

*% activator not measured.

EXAMPLE 2

A preactivated organophilic clay gellant which has been prepared by dry blending an organophilic clay (made from dimethyl bis(hydrogenated tallow) ammonium chloride and bentonite) with 7% by total weight of 1,6-hexanediol in accordance with Example 1 is added at a 7% level to Conoco 5735 oil. A grease pregel is prepared by mixing the preactivated gellant and Conoco oil for 5 minutes with a drill press stirrer operating at 450 rpm. 0.1% water based on the weight of grease is added and the pregel mixed an additional 25 minutes with a drill press stirrer at 450 rpm. Viscosity of the pregel is measured with a Brookfield RVT viscometer. The grease pregel is passed through a Tri-Homo mill with a rotor-to-stator gap of 0.003 inch and a pump speed of 230 grams/minute. The grease is cooled to room temperature and a penetration measurement made according to ASTM Method D217-82 using a grease penetrometer available from GCA/Precision Scientific Company. The grease is then put in a grease worker available from Koehler Instrument Company and penetration values are measured after 60 and $10^4$ strokes. Results are presented in Table I.

COMPARATIVE EXAMPLE A

For comparison purposes, the preactivated organophilic clay of Example 2 is replaced by BENTONE 34 (a 95 m.e.r. dimethyl bis(hydrogenated tallow) ammonium bentonite (which is a trademarked commercial product of NL Industries that is prepared under conventional commercial processing conditions). In place of 0.1% water, the organophilic clay is activated with 2% acetone by weight of the grease (i.e., 22% by total weight of the organophilic clay and acetone). Viscosity data are presented in Table I.

COMPARATIVE EXAMPLE B

For comparison purposes, the preactivated organophilic clay gellant of Example 2 is replaced by BENTONE 34 dry blended with 7% 1,6-hexanediol powder that has been previously ground cold in a centrifugal mill fitted with a 0.5 mm screen. Viscosity data are presented in Table I.

COMPARATIVE EXAMPLE C

For comparison purposes, the organophilic clay of Example 2 is replaced by BARAGEL 40 (a 100 m.e.r. dimethyl bis(hydrogenated tallow) ammonium bentonite (which is a trademarked commercial product of NL Industries that is prepared under conventional commercial processing conditions) and is dry blended with 7% 1,6-hexanediol powder that has been previously ground cold in a centrifugal mill fitted with a 0.5 mm screen. Viscosity data are presented in Table I.

TABLE I

| Sample | Pregel (cP at 5 rpm) | Milled Grease (Penetration) | | |
|---|---|---|---|---|
| | | 0 | 60 | $10^4$ |
| Example 2 | 10,800 | 211 | 227 | 238 |
| Comparative Example A | 6,300 | 248 | 265 | 266 |
| Comparative Example B | 520 | 404 | 383 | 459 |
| Comparative Example C | 600 | 308 | 346 | 375 |

EXAMPLE 3

About 40 gallons of a 3.04% solids slurry of Wyoming bentonite in water which has been previously treated by centrifugation to remove all non-clay impurities and ion-exchanged to provide the clay in the sodium form is passed through a Manton-Gaulin homogenizer at 5000 psi pressure. 8717.1 grams of this slurry is placed in a reaction vessel of a suitable size (40 liters) and diluted with 1325 ml of water. The slurry is heated to 60° C. with stirring. 171.9 grams of 90% active dimethyl bis(hydrogenated tallow) ammonium chloride (101 m.e. per 100 grams clay) dissolved in 310 ml of isopropanol and 560 ml of water is poured into the clay slurry. (The amount of water added to the reaction slurry is equal to an amount which, when added to the clay slurry, will yield a solids content of 2.5%). The mixture is stirred for 30 minutes at 60° C. and the solids are collected on a vacuum filter. The filter cake is washed with hot (60° C.) water. The filter cake is reslurried in water, 6.2% 1,6-hexanediol is added and the slurry is force air dried at 40° C. for 24 hours to remove residual water. The dried preactivated organophilic clay gellant is ground in a centrifugal mill fitted with a 0.5 mm screen to break apart the agglomerates.

EXAMPLE 4

The preactivated organophilic clay gellant of Example 2 is replaced by the preactivated organophilic clay gellant of Example 3. The preactivated organophilic clay gellant of Example 3 is evaluated at a 7.5% level in Conoco 5735 oil. Viscosity data are presented in Table II.

COMPARATIVE EXAMPLE D

To demonstrate the effect of not adding 0.1% water to greases prepared using the composition of this invention, the preactivated organophilic clay gellant of Example 2 is replaced by the preactivated organophilic clay gellant of Example 3. The preactivated clay gellant of Example 3 is evaluated at a 7.5% level in Conoco 5735 oil. 0.1% water is not added to the grease formulation. Viscosity data are presented in Table II.

TABLE II

| Sample | Pregel (cP at 5 rpm) | Milled Grease (Penetration) | | |
|---|---|---|---|---|
| | | 0 | 60 | $10^4$ |
| Example 4 | 1,304 | 208 | 224 | 209 |
| Comparative Example D | 576 | 239 | 278 | 270 |

EXAMPLE 5

About 40 gallons of a 3.03% solids slurry of Wyoming bentonite in water which has been previously treated by centrifugation to remove all non-clay impurities and ion-exchanged to provide the clay in the sodium form is passed through a Manton-Gaulin homogenizer at 5000 psi pressure. 21,947 grams of this slurry is placed in a reaction vessel of a suitable size (40 liters) and diluted with 3253 ml of water. The slurry is heated to 60° C. with stirring. 431.5 grams of 90% active dimethyl bis(hydrogenated tallow) ammonium chloride (101 m.e. per 100 grams clay) dissolved in 760 ml isopropanol and 1400 ml of water is poured into the clay slurry. (The amount of water added to the reaction slurry is equal to an amount which, when added to the clay slurry, will yield a solids content of 2.5%). The mixture is stirred from 30 minutes at 60° C. and the solids are collected on a vacuum filter. The filter cake is washed with hot (60° C.) water.

EXAMPLE 6

A portion of the washed filter cake of Example 5 is reslurried in water, 7.3% 1,6-hexanediol is added and the slurry is force air dried at 40° C. for 24 hours to remove residual water. The dried preactivated organophilic clay gellant is ground in a centrifugal mill fitted with a 0.5 mm screen to break apart the agglomerates.

EXAMPLE 7

A portion of the washed filter cake of Example 5 is force air dried at 40° C. for 16 hours to remove residual water from the organophilic clay. The dried organophilic clay is ground in a centrifugal mill fitted with a 0.5 mm screen to break apart the agglomerates.

EXAMPLE 8

The preactivated organophilic clay gellant of Example 2 is replaced by the preactivated organophilic clay gellant of Example 6. The preactivated organophilic clay gellant of Example 6 is evaluated at a 6.5% level in Conoco 5735 oil. Viscosity data are presented in Table III.

COMPARATIVE EXAMPLE E

To demonstrate the effect of post adding the preactivating agent to the grease formulation as opposed to reacting the preactivating agent with the organophilic clay, the preactivated organophilic clay of Example 2 is replaced by the organophilic clay of Example 7. The organophilic clay of Example 7 is evaluated at a 6.0% level in Conoco 5735 oil. In addition to adding 0.1% water to the organophilic clay/Conoco oil mixture, 7.3% 1,6-hexanediol (the % based on the total weight of organophilic clay and 1,6-hexanediol) that has been previously ground cold in a centrifugal mill fitted with a 0.5 mm screen, is added to the grease formulation. Viscosity data are presented in Table III.

TABLE III

| Sample | Pregel (cP at 5 rpm) | Milled Grease (Penetration) | | |
|---|---|---|---|---|
| | | 0 | 60 | $10^4$ |
| Example 8 | 7,000 | 215 | 228 | 234 |
| Comparative Example E | 960 | 246 | 284 | 257 |

The viscosity data in Table III clearly display a significant advantage of the preactivated organophilic clay gellant of the present invention for gelling grease systems versus employing the same preactivating agent by separate post addition to the organophilic clay/oil mixture. The improved pregel viscosity and improved milled viscosity performance displayed by the preactivated organophilic clay gellant of the present invention (Example 8) suggests that the invention more readily embodies the oil system than does the organophilic clay in which the dispersion agent is post added separately (Comparative Example E). This viscosity advantage may very possibly be due to the increased $d_{001}$ basal plane spacing observed for the invention compared to that of the base organophilic clay. The increased d-spacing indicates that a distinct interaction occurs between the organophilic clay and the dispersing agent when these two components are pre-mixed prior to introduction to the oil. This example further demonstrates that the order of grease component addition is important and that grease preparation utilizing the preactivated organophilic clay gellant of the present invention is greatly preferred.

EXAMPLE 9

About 40 gallons of a 3.04% solids slurry of Wyoming bentonite in water which has been previously treated by centrifugation to remove all non-clay impurities and ion-exchanged to provide the clay in the sodium form is passed through a Manton-Gaulin homogenizer at 5000 psi pressure. 21,875 grams of this slurry is placed in a reaction vessel of a suitable size (40 liters) and diluted with 3325 ml of water. The slurry is heated at 60° C. with stirring. 431.5 grams of 90% active dimethyl bis(hydrogenated tallow) ammonium chloride (101 m.e. per 100 grams of clay) dissolved in 760 ml isopropanol and 1400 ml of water is poured into the clay slurry. (The amount of water added to the reaction slurry is equal to an amount which, when added to the clay slurry, will yield a solids content of 2.5%). The mixture is stirred for 30 minutes at 60° C. and the solids are collected on a vacuum filter. The filter cake is washed with hot (60° C.) water.

EXAMPLE 10

A portion of the washed filter cake of Example 9 is reslurried in water, 9.6% by total weight of p-nitrobenzyl alcohol dissolved in isopropanol is added and the slurry is force air dried at 40° C. for 24 hours to remove residual water. The dried preactivated organophilic clay gellant is ground in a centrifugal mill fitted with a 0.5 mm screen to break apart the agglomerates.

EXAMPLE 11

A portion of the washed filter cake of Example 9 is reslurried in water, 9.5% by total weight of phthalide dissolved in isopropanol is added and the slurry is force air dried at 40° C. for 24 hours to remove residual water. The dried preactivated organophilic clay gellant is ground in a centrifugal mill fitted with a 0.5 mm screen to break apart the agglomerates.

EXAMPLE 12

To demonstrate that nitrated alcohols function as preactivating agents for organophilic clays of the present invention, the preactivated organophilic clay gellant of Example 2 is replaced by the preactivated organophilic clay gellant of Example 10. Viscosity data are presented in Table IV.

EXAMPLE 13

To demonstrate that aromatic ketones function as preactivating agent for organophilic clays of the present invention, the preactivated organophilic clay gellant of Example 2 is replaced by the preactivated organophilic clay gellant of Example 11. Viscosity data are presented in Table IV.

TABLE IV

| Sample | Pregel (cP at 5 rpm) | Milled Grease (Penetration) | | |
|---|---|---|---|---|
| | | 0 | 60 | $10^4$ |
| Example 12 | 2,200 | 218 | 235 | 227 |
| Example 13 | 15,200 | 208 | 222 | 232 |

EXAMPLE 14

About 40 gallons of a 1.78% solids slurry of Wyoming bentonite in water which has been previously treated by centrifugation to remove all non-clay impurities and ion-exchanged to provide the clay in the sodium form is passed through a Manton-Gaulin homogenizer at 5000 psi pressure. 10,393 grams of this slurry is placed in a reaction vessel of a suitable size (40 liters) and heated to 65° C. with stirring. 109.1 grams of a 91.7% active dimethyl bis(hydrogenated tallow) ammonium chloride (93.6 m.e. for 100 grams clay) and 9.24 grams of a 89.8% active dimethyl benzyl hydrogenated tallow ammonium chloride (10.4 m.e. per 100 grams clay), i.e., a 90%/10% 2M2Ht/2MBHt mixture, is melted and poured into the clay slurry. 175 ml of hot water is used to rinse the vessel initially containing the organic cation. (The amount of water added to the reaction slurry is equal to an amount which, when added to the clay slurry, will yield a solids content of 1.75%). The mixture is stirred for 30 minutes at 65° C. and the solids are collected on a vacuum filter. The filter cake is washed with hot (60° C.) water and force air dried at 40° C. for 16 hours to remove residual water from the organophilic clay. The dried organophilic clay is ground in a centrifugal mill fitted with a 0.5 mm screen to break apart the agglomerates.

The dried, ground organophilic clay is dry blended in a P-K blender for 1 hour with 7% by total weight of 1,6-hexanediol powder that has been previously ground cold in a centrifugal mill fitted with a 0.5 mm screen.

EXAMPLE 15

To demonstrate that organophilic clays composed of 104 m.e. (90%/10% 2M2Ht/2MBHt)/bentonite can function as the base organophilic clay for preactivated organophilic clay gellants of the present invention, the preactivated organophilic clay gellant of Example 2 is replaced by the preactivated organophilic clay gellant of Example 14. Viscosity data are presented in Table V.

COMPARATIVE EXAMPLE F

For comparison purposes, the preactivated organophilic clay gellant of Example 2 is replaced by BARAGEL (a 99 m.e.r. [90% dimethyl bis(hydrogenated tallow) ammonium/10% dimethyl benzyl hydrogenated tallow ammonium] bentonite (which is a trademarked commercial product of NL Industries). In substitution of 0.1% water, the organophilic clay is activated with 2% acetone by weight of the grease (i.e., 22% by total weight of the organophilic clay and acetone). Viscosity data are presented in Table V.

COMPARATIVE EXAMPLE G

For comparison purposes, the preactivated organophilic clay gellant of Example 2 is replaced by BARAGEL dry blended with 7% 1.6-hexanediol powder that has been previously ground cold in a centrifugal mill fitted with a 0.5 mm screen. Viscosity data are presented in Table V.

TABLE V

| Sample | Pregel (cP at 5 rpm) | Milled Grease (Penetration) | | |
|---|---|---|---|---|
| | | 0 | 60 | $10^4$ |
| Example 15 | 30,000 | 217 | 243 | 250 |
| Comparative Example F | 8,200 | 267 | 280 | 277 |
| Comparative Example G | 480 | 420 | 453 | (fluid) |

COMPARATIVE EXAMPLE H

For comparison purposes, the preactivated organophilic clay gellant of Example 2 is replaced by Clayamine EPA (a commercial product from United Catalysts, Inc.), a self-activating organophilic clay composed of 90% bentonite clay modified with a quaternary ammonium compound and 10% 2,2-dimethyl-1,3-propanediol. Viscosity data are presented in Table VI.

TABLE VI

| Sample | Pregel (cP at 5 rpm) | Milled Grease (Penetration) | | |
|---|---|---|---|---|
| | | 0 | 60 | $10^4$ |
| Comparative Example H | 720 | 377 | 407 | 456 |

The data clearly show that the self-activating Clayamine EPA is not as an effective grease gellant as the preactivated organophilic clay gellant of the present invention.

EXAMPLE 16

About 40 gallons of a 3.03% solids slurry of Wyoming bentonite in water which has been previously treated by centrifugation to remove all non-clay impurities and ion-exchanged to provide the clay in the sodium form is passed through a Manton-Gaulin homogenizer at 5000 psi pressure. 21,947 grams of this slurry is placed in a reaction vessel of a suitable size (40 liters) and diluted with 3253 ml of water. The slurry is heated to 60° C. with stirring. 431.5 grams of 90% active dimethyl bis(hydrogenated tallow) ammonium chloride (101 m.e. per 100 grams clay) dissolved in 760 ml isopropanol and 1400 ml of water is poured into the clay slurry. (The amount of water added to the reaction slurry is equal to an amount which, when added to the clay slurry, will yield a solids content of 2.5%). The mixture is stirred for 30 minutes at 60° C. and the solids are collected on a vacuum filter. The filter cake is washed with hot (60° C.) water and force air dried at 40° C. for 16 hours to remove residual water from the organophilic clay. The dried organophilic clay is ground in a centrifugal mill fitted with a 0.5 mm screen to break apart the agglomerates.

COMPARATIVE EXAMPLE I

The following comparative examples demonstrate that the most preferred activating agent (2,2-dimethyl-1,3-propanediol) cited by U.S. Pat. No. 4,435,218 is not an effective preactivating agent for the preactivated organophilic clay gellants of the present invention employed in grease systems. For comparison purposes, the preactivated organophilic clay gellant of Example 2 is replaced at a 6.25% gellant level by the organophilic clay of Example 16 dry blended with 4% by total weight of 2,2-dimethyl-1,3 -propanediol which has been previously ground in a centrifugal mill fitted with a 0.5 mm screen. Viscosity data are presented in Table VII.

COMPARATIVE EXAMPLE J

For comparison purposes, the preactivated organophilic clay gellant of Example 2 is replaced at a 6.4% gellant level by the organophilic clay of Example 16 which has been dry blended with 6% by total weight of 2,2-dimethyl-1,3-propanediol and ground in a centrifugal mill fitted with a 0.5 mm screen. Viscosity data are presented in Table VII.

COMPARATIVE EXAMPLE K

For comparison purposes, the preactivated organophilic clay gellant of Example 2 is replaced at a 6.5% gellant level by the organophilic clay of Example 16 which has been dry blended with 8% by total weight of 2,2-dimethyl-1,3-propanediol and ground in a centrifugal mill fitted with a 0.5 mm screen. Viscosity data are presented in Table VII.

TABLE VII

| Sample | Pregel (cP at 5 rpm) | Milled Grease (Penetration) | | |
|---|---|---|---|---|
| | | 0 | 60 | $10^4$ |
| Comparative Example I | 120 | 339 | 356 | 340 |
| Comparative Example J | 1,160 | 253 | 276 | 292 |
| Comparative Example K | 10,400 | 238 | 292 | 353 |

The data presented in Table VII indicate that high grease viscosity and good mechanical stability are not achieved when various levels of 2,2-dimethyl-1,3-propanediol are employed as a preactivating agent for the preactivated organophilic clay gellant of the present invention.

EXAMPLE 17

About 40 gallons of a 3.17% solids slurry of Wyoming bentonite in water which has been previously treated by centrifugation to remove all non-clay impurities and ion-exchanged to provide the clay in the sodium form is passed through a Manton-Gaulin homogenizer at 5000 psi pressure. 2839.1 grams of this slurry is placed in a reaction vessel of a suitable size (8 liters) and diluted with 561 ml of water. The slurry is heated to 65° C. with stirring. 63.27 grams of melted 89.3% active benzyl methyl dihydrogenated tallow ammonium chloride (104 m.e. per 100 grams clay) is poured into the clay slurry. 200 ml of hot water is used to rinse the vessel initially containing the organic cation. (The amount of water added to the reaction slurry is equal to an amount which, when added to the clay slurry, will yield a solids content of 2.5%). The mixture is stirred for 30 minutes at 65° C. and the solids are collected on a vacuum filter. The filter cake is washed with hot (60° C.) water and force air dried at 40° C. for 16 hours to remove residual water from the organophilic clay. The dried organophilic clay is ground in a centrifugal mill fitted with a 0.5 mm screen to break apart the agglomerates.

EXAMPLE 18

55 grams of the dried, ground organophilic clay of Example 18 is dry blended in a P-K blender for 1 hour with 4.14 grams 1,6-hexanediol power (to comprise 7% of the total weight of the preactivated organophilic clay) that has been previously ground cold in a centrifugal mill fitted with a 0.5 mm screen.

EXAMPLE 19

This Example demonstrates the excellent dispersion properties when an organophilic clay reacted with 1,6-hexanediol is used in a red ink formulation. A base red ink is prepared according to Formulation 1.

| Formulation 1 Heatset Red Base | | | |
|---|---|---|---|
| Ingredient | Generic Name | Manufacturer | Formulation % by Weight |
| Lo-Cal A-7-T | Low Energy Heatset Varnish | Lauter Chemicals | 54.18 |
| Dyall C-219 at 45% by wt. in Magiesol 47 | 45% High Melting Point Microwax Dispersion in Deodorized Ink Oil | Lauter Chemicals Magie Brothers | 6.40 |
| Dyall C-188 at 40% by wt. in Magiesol 47 | 40% Dispersion of Fisher-Tropsch Wax in Deodorized Ink Oil | Lauter Chemicals Magie Brothers | 4.25 |
| BASF 66-PP-0229 Predispersed Red Paste | Lithol Rubine in Heatset Vehicle | BASF | 33.00 |
| 15% Shell Ionol CP in Magiesol 47 | Antiskin Compound | Shell Company Magie Brothers | 2.17 |

A red ink is prepared according to Formulation 2. 100 grams of base red ink is weighed into a pint can and mixed for 1 minute on a Dispermat CV (a Cowles Dispersator) at 3000 rpm. After one minute the preactivated organophilic clay gellant prepared according to Example 18 is slowly added to the vortex of the ink. After the addition of the gellant to the ink formulation, the ink is dispersed at high speed at 3000 rpm for 15 minutes. NPIRI (National Printing Ink Research Institute) grind values are measured at 5, 10 and 15 minutes to evaluate dispersion. At 5, minutes, 0.7 parts 95% methanol/5% water is added to the ink. At 10 minutes, Magiesol 47 solvent is added to adjust ink tack.

| Formulation 2 Heatset Red Ink Formula | | |
|---|---|---|
| Ingredient | Source | Parts by Weight |
| Heatset Red Base | Formulation 1 | 100.0 |
| Organophilic Clay Gellant | Example 18 | 2.2 |
| 95% Methanol/5% Water | | 0.7 |
| Magiesol 47 | Magie Brothers | 12.5 |
| | | 115.4 |

Dispersion ratings are presented in Table VIII. The ink is rated for overall scratches and background haze. A dispersion rating of medium heavy indicates poor dispersion resulting in many scratches and a medium to heavy background haze. A rating of light indicates better dispersion properties although some background haze is evident. A rating of clean indicates good dispersion properties with the absence of large agglomerates or aggregates.

Viscosities are measured using the Thwing Albert falling rod viscometer at 25° C. according to ASTM Method D4040-81 entitled "Viscosity of Printing Inks and Vehicles by the Falling Rod Viscometer". Dispersion measurements, viscosities and yield values are presented in Table VIII. A yield value is the force required to induce flow.

COMPARATIVE EXAMPLE L

The organophilic clay gellant of Example 18 is replaced by an organophilic clay gellant prepared in accordance with Example 17 at an equal weight loading in the heatset red ink formulation described in Example 19.

Dipsersion and viscosity data for the ink formulation are presented in Table VIII.

TABLE VIII

| | Dispersion at 3,000 rpm | | | Viscosity | Yield Value |
|---|---|---|---|---|---|
| Example | 5 Min. | 10. Min. | 15 Min. | (poise) | /cm$^2$)- |
| Example 19 | Medium-Heavy | Medium | Light | 71 | 1041 |
| Comparative Example L | Heavy | Heavy | Medium | * | * |

*Not measured due to poor grind (dispersion values)

Table VIII shows that the composition made in accordance with the present invention imparts better dispersion properties than the Comparative Example.

The invention being thus described, it will be obvious that the same may be varied in many ways. However, such variations are not to be regarded as a departure from the spirit and scope of the invention, and all such modifications are intended to be included within the scope of the following claims.

What is claimed is:

1. A dry preactivated organophilic clay gellant for lubricating greases comprising:
   (a) an organophilic clay gellant which is the reaction product of (i) a smectite-type clay having a cation exchange capacity of at least 75 milliequivalents per 100 grams of clay, and (ii) organic cation in an amount ranging from about 90 to about 150% of the cation exchange capacity of the smectite-type clay; and
   (b) a preactivating agent reacted with the organophilic clay gellant, said preactivating agent being from about 1 to about 25% by weight of the organophilic clay gellant and being selected from the group consisting of
phthalide,
3-hydroxy-4-methoxy benzaldehyde,
4-benzyloxypropiophenone,
triethyl citrate,
2-phenoxyethanol,
1-phenyl-1,2-ethanediol,
o-, m- and p-nitrobenzyl alcohol,
1,6-hexanediol,
castor oil,
o-, m- and p-nitrophenethyl alcohol, and mixtures thereof.

2. The dry preactivated organophilic clay gellant of claim 1 wherein the smectite-type clay is selected from the group consisting of bentonite, hectorite, and mixtures thereof.

3. The dry preactivated organophilic clay gellant of claim 2 wherein the smectite-type clay is bentonite.

4. The dry preactivated organophilic clay gellant of claim 1 wherein the amount of organic cation is from about 100 to about 130% of the cation exchange capacity of the smectite-type clay.

5. The dry preactivated organophilic clay gellant of claim 4 wherein the amount of organic cation is from about 100 to about 116% of the cation exchange capacity of smectite-type clay.

6. The dry preactivated organophilic clay gellant of claim 1 wherein the organic cation contains at least one lineal or branched, saturated or unsaturated alkyl group having 12 to 22 carbon atoms.

7. The dry preactivated organophilic clay gellant of claim 6 wherein the organic cation is at least one of

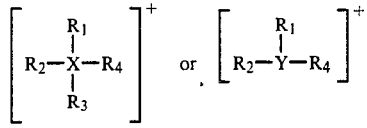

wherein X is a nitrogen or phosphorous, Y is sulfur, $R_1$ is a lineal or branched, saturated or unsaturated alkyl group having 12 to 22 carbon atoms and $R_2$, $R_3$ and $R_4$ are independently selected from (a) lineal or branched alkyl groups having 1 to 22 carbon atoms; (b) aralkyl group which are benzyl and substituted benzyl moieties including fused ring moieties having lineal or branched 1 to 22 carbon atoms in the alkyl portion of the structure: (c) aryl groups such as phenyl and substituted phenyl including fused ring aromatic substituents; (d) beta, gamma- unsaturated groups having six or less carbon atoms or hydroxylalkyl groups having 2 to 6 carbon atoms; and (e) hydrogen.

8. The dry preactivated organophilic clay gellant of claim 7 wherein the organic cation is ammonium, $R_1$ and $R_2$ are lineal or branched, saturated or unsaturated alkyl groups having 12 to 22 carbon atoms and $R_3$ and $R_4$ are lineal or branched, saturated or unsaturated alkyl groups having 1 to 12 carbon atoms.

9. The dry preactivated organophilic clay gellant of claim 8 wherein the organic cation is dimethyl bis(hydrogenated tallow) ammonium.

10. The dry preactivated organophilic clay gellant of claim 7 wherein the organic cation is ammonium, $R_2$ is an aralkyl group having a lineal or branched, saturated or unsaturated alkyl group having 1 to 12 carbons in the alkyl portion and $R_3$ and $R_4$ are lineal or branched, saturated or unsaturated alkyl groups having 1 to 12 carbon atoms.

11. The dry preactivated organophilic clay gellant of claim 10 wherein the organic cation is dimethyl benzyl hydrogenated tallow ammonium.

12. The dry preactivated organophilic clay gellant of claim 1 wherein the organic cation is a mixture of dimethyl bis(hydrogenated tallow) ammonium and dimethyl benzyl hydrogenated tallow ammonium.

13. The dry preactivated organophilic clay gellant of claim 1 wherein the preactivating agent is selected from the group consisting of phthalide, o-, m- and p-nitrobenzyl alcohol, o-, m- and p-nitrophenyl alcohol, 1-phenyl-1,2-ethanediol, 1,6-hexanediol and mixtures thereof.

14. The dry preactivated organophilic clay gellant of claim 13 wherein the preactivating agent is 1,6-hexanediol.

15. The dry preactivated organophilic clay gellant of claim 1 wherein the moisture content is less than about 5% by weight.

16. The dry preactivated organophilic clay gellant of claim 15 wherein the moisture content is less than about 2% by weight.

17. A lubricating grease thickened with a preactivated organophilic clay gellant comprising:
   (a) a lubricating grease base fluid;
   (b) a preactivated organophilic clay gellant which is the reaction product of an organophilic clay gellant and a preactivating agent, wherein the amount of preactivated organophilic clay gellant is from about 1 to about 12% by weight of the lubricating grease, said oranophilic clay gellant being the reaction product of a smectite-type clay having a cation exchange capacity of at least 75 milliequivalents per 100 grams of clay and organic cation in an amount ranging from about 90 to about 150% of the cation exchange capacity of the smectite-type and said preactivating agent being from about 1 to about 25% by weight of the organophilic clay gellant and being selected form the group consisting of
phthalide,
3-hydroxy-4-methoxy benzaldehyde,
4-benzyloxypropiophenone,
triethyl citrate,
2-phenoxyethanol,
1-phenyl-1,2-ethanediol,
o-, m- and p-nitrobenzyl alcohol,
1,6-hexanediol,
castor oil, o-, m- and p-nitrophenethyl alcohol, and mixtures thereof; and (c) water in an amount ranging from about 0.1 to about 10% by weight of the organophilic clay gellant.

18. The lubricating grease of claim 17 wherein the lubricating grease base fluid is a low viscosity index oil or a high viscosity index oil.

19. The lubricating grease of claim 18 wherein the lubricating grease base fluid is a high viscosity index oil.

20. The lubricating grease of claim 19 wherein the high viscosity index oil is composed of about 68% paraffinic, about 28% naphthenic and about 4% aromatic components by weight.

21. The lubricating grease of claim 17 wherein the smectite-type clay is selected from the group consisting of bentonite, hectorite, and mixtures thereof.

22. The lubricating grease of claim 21 wherein the smectite-type clay is bentonite.

23. The lubricating grease of claim 17 wherein the amount of organic cation is from about 100 to about 130% of the cation exchange capacity of the smectite-type clay.

24. The lubricating grease of claim 23 wherein the amount of organic cation is from about 100 to about 116% of the cation exchange capacity of smectite-type clay.

25. The lubricating grease of claim 17 wherein the organic cation contains at least one lineal or branched, saturated or unsaturated alkyl group having 12 to 22 carbon atoms.

26. The lubricating grease of claim 25 wherein the organic cation is at least one of

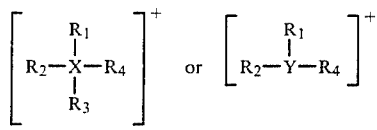

wherein X is a nitrogen or phosphorous, Y is sulfur, $R_1$ is a lineal or branched, saturated or unsaturated alkyl group having 12 to 22 carbon atoms and $R_2$, $R_3$ and $R_4$ are independently selected from (a) lineal or branched alkyl groups having 1 to 22 carbon atoms; (b) aralkyl group which are benzyl and substituted benzyl moieties including fused ring moieties having lineal or branched 1 to 22 carbon atoms in the alkyl portion of the structure; (c) aryl groups such as phenyl and substituted phenyl including fused ring aromatic substituents; (d) beta, gamma-unsaturated groups having six or less carbon atoms or hydroxylalkyl groups having 2 to 6 carbon atoms; and (e) hydrogen.

27. The lubricating grease of claim 26 wherein the organic cation is ammonium, $R_1$ and $R_2$ are lineal or branched, saturated or unsaturated alkyl groups having 12 to 22 carbon atoms and $R_3$ and $R_4$ are lineal or branched, saturated or unsaturated alkyl groups having 1 to 12 carbon atoms.

28. The lubricating grease of claim 27 wherein the organic cation is dimethyl bis(hydrogenated tallow) ammonium.

29. The lubricating grease of claim 26 wherein the organic cation is ammonium, $R_2$ is an aralkyl group having a lineal or branched, saturated or unsaturated alkyl group having 1 to 12 carbons in the alkyl portion and $R_3$ and $R_4$ are lineal or branched, saturated or unsaturated alkyl groups having 1 to 12 carbon atoms.

30. The lubricating grease of claim 29 wherein the organic cation is dimethyl benzyl hydrogenated tallow ammonium.

31. The lubricating grease of claim 17 wherein the organic cation is a mixture of dimethyl bis(hydrogenated tallow) ammonium and dimethyl benzyl hydrogenated tallow ammonium.

32. The lubricating grease of claim 17 wherein the preactivating agent is selected from the group consisting of phthalide, o-, m- and p-nitrobenzyl alcohol, o-, m- and p-nitrophenyl alcohol, 1-phenyl-1,2-ethanediol, 1,6-hexanediol and mixtures thereof.

33. The lubricating grease of claim 32 wherein the preactivating agent is 1,6-hexanediol.

34. The lubricating grease of claim 17 wherein the amount of preactivated organophilic clay gellant is from about 4 to about 8% by weight of the lubricating grease.

35. The lubricating grease of claim 17 wherein the amount of water is from about 0.5 to about 6.0% by weight of the preactivated organophilic clay gellant.

36. The lubricating grease of claim 17 wherein the amount of water is from about 2.0 to about 4.0% by weight of the preactivated organophilic clay gellant.

37. The lubricating grease of claim 17 wherein the unworked lubricating grease has a cone penetration of 315 or lower.

38. The lubricating grease of claim 17 wherein the unworked lubricating grease has a cone penetration of 300 or lower.

39. The lubricating grease of claim 17 wherein the unworked lubricating grease has a cone penetration of 290 or lower.

40. The lubricating grease of claim 17 wherein the difference in cone penetration values after 60 and 10,000 strokes is less than about 50.

41. The lubricating grease of claim 17 wherein the difference in cone penetration values after 60 and 10,000 strokes is less than about 25.

42. The lubricating grease of claim 17 wherein the difference in cone penetration values after 60 and 10,000 strokes is less than about 10.

43. A process for preparing a preactivated organophilic clay gellant comprising:

(a) preparing a slurry of smectite-type clay having a cation exchange capacity of at least 75 milliequivalents per 100 grams of clay, wherein said clay is dispersed in water at a concentration of from about 0.5 to abut 80% by weight;

(b) subjecting the slurry to high shear conditions whereby clay agglomerates are separated;

(c) reacting the smectite-type clay with organic cation in an amount ranging from about 90 to about 150% of the cation exchange capacity of the smectite-type clay whereby at least some of the cation exchange sites of the smectite-type clay are substituted with organic cation thereby forming an organophilic clay gellant; and (d) reacting the organophilic clay gellant with a preactivating agent in an amount of from about 1 to about 25% by weight of the organophilic clay gellant and having at least one active group selected from the group consisting of carboxyl, hydroxyl, primary amine, secondary amine, tertiary amine, aldehyde, ketone, ether, ester, nitro and sulfo whereby the resultant preactivated organophilic clay gellant exhibits an increase in d-spacing of at least one angstrom.

44. The process of claim 43 wherein the sheared clay exhibits an increase in cation exchange capacity of from about 10 to about 50% as determined by the methylene blue spot test when compared to unsheared clay.

45. The process of claim 44 wherein the sheared clay exhibits an increase in cation exchange capacity of from about 15 to about 40% as determined by the methylene blue spot test when compared to unsheared clay.

46. The process of claim 43 wherein the sheared clay exhibits a reduction in median particle size of from about 10 to about 80% when compared to unsheared clay.

47. The process of claim 46 wherein the sheared clay exhibits a reduction in median particle size of from about 20 to about 60% when compared to unsheared clay.

48. The process of claim 43 wherein the high shear conditions are achieved by passing the slurry at least one time through a Manton-Gaulin homogenizer operating at from about 500 to about 8,000 psi.

49. The process of claim 43 wherein the smectite-type clay and the organic cation are reacted in a slurry containing from about 0.5 to about 2.5% by weight of the smectite-type clay.

50. The process of claim 49 wherein the slurry contains from about 0.5 to about 2% by weight of the smectite-type clay.

51. The process of claim 43 wherein the organophilic clay gellant is dried prior to reaction with the preactivating agent.

52. The process of claim 51 wherein the organophilic clay gellant is dried such that the temperature of the organophilic clay gellant does not exceed 80° C.

53. The process of claim 52 wherein the organophilic clay gellant is dried in an airstream of from 0° to about 80° C.

54. The process of claim 53 wherein the organophilic clay gellant is dried in an airstream of from 0° to about 50° C.

55. The process of claim 52 wherein the organophilic clay gellant is dried in a fluidized bed.

56. The process of claim 52 wherein the organophilic clay gellant is freeze dried.

57. The process of claim 51 wherein the preactivating agent is reacted with the dry organophilic clay gellant by dry mixing.

58. The process of claim 51 wherein the preactivating agent is reacted with the dry organophilic clay gellant by contacting with melted preactivating agent or by contact with a liquid dispersion of the preactivating agent.

59. The process of claim 43 wherein the organophilic clay gellant is wet when reacted with the preactivating agent.

60. The process of claim 59 wherein the preactivating agent is formed into a liquid dispersion which is contacted with the wet organophilic clay gellant.

61. The process of claim 59 wherein the preactivated organophilic clay gellant is dried such that the temperature of the preactivated organophilic clay gellant does not exceed 80° C.

62. The process of claim 61 wherein the preactivated organophilic clay gellant is dried in an airstream of from 0° to about 80° C.

63. The process of claim 62 wherein the preactivated organophilic clay gellant is dried in an airstream of from 0° to about 50° C.

64. The process of claim 61 wherein the preactivated organophilic clay gellant is dried in a fluidized bed.

65. The process of claim 61 wherein the preactivated organophilic clay gellant is freeze dried.

66. The process of claim 43 wherein the organophilic clay gellant is dried at a temperature above about 80° C. and then dry milled with the preactivating agent.

67. The process of claim 43 wherein the preactivating agent is selected from the group consisting of
phthalide,
3-hydroxy-4-methoxy benzaldehyde,
4-benzyloxypropiophenone,
triethyl citrate,
2-phenoxyethanol,
1-phenyl-1,2-ethanediol,
o-, m- and p-nitrobenzyl alcohol,
1,6-hexanediol,
castor oil,
o-, m- and p-nitrophenethyl alcohol, and mixtures thereof.

68. The process of claim 67 wherein the preactivating agent is selected from phthalide, o-, m- and p-nitrobenzyl alcohol, o-, m- and p-nitrophenyl alcohol, 1-phenyl-1,2-ethanediol, 1,6-hexanediol and mixtures thereof.

69. The process of claim 68 wherein the preactivating agent is 1,6-hexanediol.

70. The preactivated organophilic clay gellant prepared by the process of claim 43.

71. The preactivated organophilic clay gellant prepared by the process of claim 49.

72. The preactivated organophilic clay gellant prepared by the process of claim 51.

73. The preactivated organophilic clay gellant prepared by the process of claim 52.

74. The preactivated organophilic clay gellant prepared by the process of claim 57.

75. The preactivated organophilic clay gellant prepared by the process of claim 59.

76. The preactivated organophilic clay gellant prepared by the process of claim 67.

77. The preactivated organophilic clay gellant prepared by the process of claim 69.

78. The dry preactivated organophilic clay gellant of claim 1 wherein the amount of preactivating agent reacted with the organophilic clay gellant is from about 3 to about 17% by weight of the organophilic clay gellant.

79. The dry preactivated organophilic clay gellant of claim 14 wherein the amount of 1,6-hexanediol is from about 1 to about 18% by weight of the organophilic clay gellant.

80. The dry preactivated organophilic clay gellant of claim 79 wherein the amount of 1,6-hexanediol is from about 3 to about 14% by weight of the organophilic clay gellant.

81. The dry preactivated organophilic clay gellant of claim 80 wherein the amount of 1,6-hexanediol is from about 4 to about 12% by weight of the organophilic clay gellant.

82. The lubricating grease of claim 17 wherein the amount of preactivating agent reacted with the organophilic clay gellant (b) is from about 3 to about 17% by weight of the organophilic clay gellant.

83. The process of claim 43 wherein the amount of preactivating agent reacted with the organophilic clay gellant (d) is from about 3 to about 17% by weight of the organophilic clay gellant.

* * * * *